(12) United States Patent
Barthel et al.

(10) Patent No.: US 7,337,369 B2
(45) Date of Patent: Feb. 26, 2008

(54) MICROPROCESSOR-CONTROLLED FIELD DEVICE FOR CONNECTION TO A FIELD BUS SYSTEM

(75) Inventors: Herbert Barthel, Herzogenaurach (DE); Wolfgang Stripf, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 354 days.

(21) Appl. No.: 10/475,710

(22) PCT Filed: Apr. 9, 2002

(86) PCT No.: PCT/DE02/01310

§ 371 (c)(1),
(2), (4) Date: Oct. 23, 2003

(87) PCT Pub. No.: WO02/086633

PCT Pub. Date: Oct. 31, 2002

(65) Prior Publication Data

US 2004/0128588 A1  Jul. 1, 2004

(30) Foreign Application Priority Data

Apr. 23, 2001   (DE) ............................ 101 19 791

(51) Int. Cl.
G06F 11/00 (2006.01)
(52) U.S. Cl. ...................................................... 714/43
(58) Field of Classification Search .................. 714/43
See application file for complete search history.

(56) References Cited

U.S. PATENT DOCUMENTS

| | | | |
|---|---|---|---|
| 6,411,923 B1 * | 6/2002 | Stewart et al. ............... 703/25 |
| 6,532,508 B2 * | 3/2003 | Heckel et al. ............... 710/110 |
| 6,611,722 B2 * | 8/2003 | Behr et al. ..................... 700/3 |
| 6,832,343 B2 * | 12/2004 | Rupp et al. ................... 714/47 |
| 6,891,850 B1 * | 5/2005 | Vandesteeg et al. ........ 370/466 |
| 2005/0249112 A1 * | 11/2005 | Barthel et al. .............. 370/216 |

FOREIGN PATENT DOCUMENTS

| | | |
|---|---|---|
| DE | 19857683 | 6/2000 |
| DE | 19904893 | 8/2000 |
| DE | 43 12 305 | 7/2004 |

OTHER PUBLICATIONS

PROFIBUS process field bus—PROFIsafe, Nov. 2003, PNO.*
Volz, "Die PNO stellt ein neues PROFIBUS-Profil fur sicherheitsgerichtete Anwendungenvor PROFISafe fur die Sicherheitstechnik", IVA International, vol. 35, pp. 6-8.

* cited by examiner

*Primary Examiner*—Michael C Maskulinski
(74) *Attorney, Agent, or Firm*—Staas & Halsey LLP

(57) ABSTRACT

A microprocessor-controlled standard field device, such as a measuring sensor or an actuator, is connected to a field bus system that, in turn, is connected to, for example, a freely programmable controller. The field device is equipped with a security layer for carrying out a security proven communication. A secure and simultaneously cost-effective communication with a control device via a field bus system is made possible by implementing a security layer in, e.g., a conventional operationally proven or redundant standard field device.

17 Claims, 1 Drawing Sheet

MICROPROCESSOR-CONTROLLED FIELD DEVICE FOR CONNECTION TO A FIELD BUS SYSTEM

CROSS REFERENCE TO RELATED APPLICATIONS

This application is based on and hereby claims priority to German Application No. 101 19 791.8 filed on Apr. 23, 2001, the contents of which are hereby incorporated by reference.

BACKGROUND OF THE INVENTION

1. Field of the Invention

The invention relates firstly to a standard field device for connection to a field bus system, which is controlled by a microprocessor. Field devices of the stated type are, for example, measured-value sensors (also referred to as sensors) or actuators. Secondly, the invention relates to a field bus system, to which at least one freely programmable safety controller and at least one standard field device, which is controlled by a microprocessor, are connected.

2. Description of the Related Art

Process technology and manufacturing can no longer be imagined without the use of the field bus technique for decentralization. Wherever people and machines need to be protected in the process and manufacturing industry, special safety devices are installed, such as sensors or actuators, in particular pressure and temperature measurement devices, emergency stop switches, step mats, light barriers and the like.

Until now, it has been possible to connect such field devices to the automation chain only by separately wired or additional special buses. Otherwise, there were too many possibilities for faults. During transfer via a so-called standard field bus, it is was thus possible, for example for messages to be lost, to occur more than once, to be additionally inserted, to appear in the incorrect sequence, to be delayed or even to be corrupted. Furthermore, there is always a risk of incorrect addressing, as a result of which, for example, standard messages could appear to be safety-relevant. Just one of these faults is sufficient to cause the entire safety mechanism to fail, and the relevant regulations do not, of course, tolerate this.

Devices of the type mentioned above are, for example, connected via a so-called Profibus (bus system from the Siemens AG Company) to a freely programmable controller, such as a failsafe PLC. Nowadays, Profibus is the most widely used field bus system, and is a component of European Standard EN 50170, and thus guarantees openness and investment protection for the user. Profibus is suitable for rapid communication to decentralized peripherals for automation of manufacture and for the communication task in process automation. It is the first field bus system which covers the requirements of both areas using identical communications services.

It should now be stated that, for safety applications, every primary fault (and this also applies to every safety circuit) must be covered within the safety time or process fault tolerance time. A second fault must be determined by regular inspection.

In the prior art, this technical problem was solved by point-to-point connections between the redundant standard field devices and the safety PLC (that is to say the freely programmable controller). With regard to a star-shaped system such as this, there were no common mode faults in the communication between the field devices and the central control unit (in this context, it should be noted that the expression common-mode fault means a failure of components resulting from a common cause). The signals from the sensors and/or from the actuators are compared in the safety PLC.

When using a field bus between the field devices and the safety PLC, it was necessary to use sensors or actuators that had been certified as being safe and which are connected to the failsafe PLC via safe communication, in order to ensure safe communication between the field devices and the controller. If redundant standard sensors and/or standard actuators were to be used in a standard communication system, then certain faults in the communications system (for example frozen signal values, that is to say primary faults) would not be covered and could lead to a dangerous state without being noticed.

SUMMARY OF THE INVENTION

The technical problem on which the invention is based is to provide standard field devices which allow safe communication with a freely programmable controller at low cost when connected to a standard field bus.

This technical problem is solved by providing a standard field device, which has a microprocessor and is designed for connection to a field bus system, to be designed with a so-called safety layer, which is known per se, for carrying out proven-safe communication with a freely programmable controller which can be connected to the field bus.

Thus, according to the invention, so-called proven-operation or redundant standard field devices (that is to say standard sensors and/or standard actuators) are for the first time provided with a safety layer, as a result of which a standard field device such as this communicates more safely, to be precise via the standard field buses of a known type. The invention is based on the idea of, so to speak, simulating a certified field device. Standard field devices for the purposes of the present invention are subject only to the so-called NAMUR Recommendation 79 (NE79). With devices such as these, integration of a safety layer is relatively simple, but this ensures that the standard field devices carry out proven-safe communication. The costs for such standard devices are far lower than for safety-certified devices. A further advantage is that changes to standard devices do not necessitate recertification, and this once again saves costs.

In general, it can be stated that a safety layer, for example such as that in a PLC, can be implemented in a simple manner in a bus-compatible field device of the type mentioned initially, that is to say in accordance with a standard. In particular, this expresses the fact that a so-called redundant driver (software modules for the failsafe PLC) receive the signals on a safe basis (drivers for Profisafe) and can carry out the comparison of the signals (on a 2-, 3- or multi-channel basis). Overall, this corresponds to the channel system for an SEL 2, SEL 3 or SEL 4 signal transmitter unit. In a configuration such as this, the safety layer, also referred to as the F layer, ensures that all common-mode faults in the field bus system are covered. The redundant driver ensures that sensor and actuator faults are covered. The redundantly used standard field devices can thus also be designed in a diverse manner with regard to process variables and, furthermore, may be devices that are already in operation.

In summary, it can be stated that, for example, bus systems which are known by the title Profisafe can for the first time be extended with a safe link to proven-operation or redundant standard field devices without any necessity for expensive certified special devices. A safety layer which is known per se (for example a Profisafe driver) is for this purpose implemented for the first time in standard field devices.

The safety layer can advantageously be switched on and off, controlled directly or via the field bus. This means that it is possible to design the normal proven-operation controller with one and the same standard field device, while on the other hand being able to carry out safety-relevant communication, however, once the safety layer has been switched on.

Finally, it should also be noted that the invention also relates to a field bus system which includes at least one freely programmable safety controller and at least one microprocessor-controlled standard field device, which is equipped with a safety layer.

As an example of a field device according to the invention, a measurement converter from the Siemens AG Company may be mentioned here, which is suitable, depending on the items fitted, for measuring pressure, flow or the filling level of non-aggressive and aggressive vapors and liquids. A measurement converter such as this is marketed under the trade mark SITRANS but can, for the first time, be equipped according to the invention with a safety layer without any major problems, so that a standard measurement device such as this can now also be used for safety-relevant communication.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
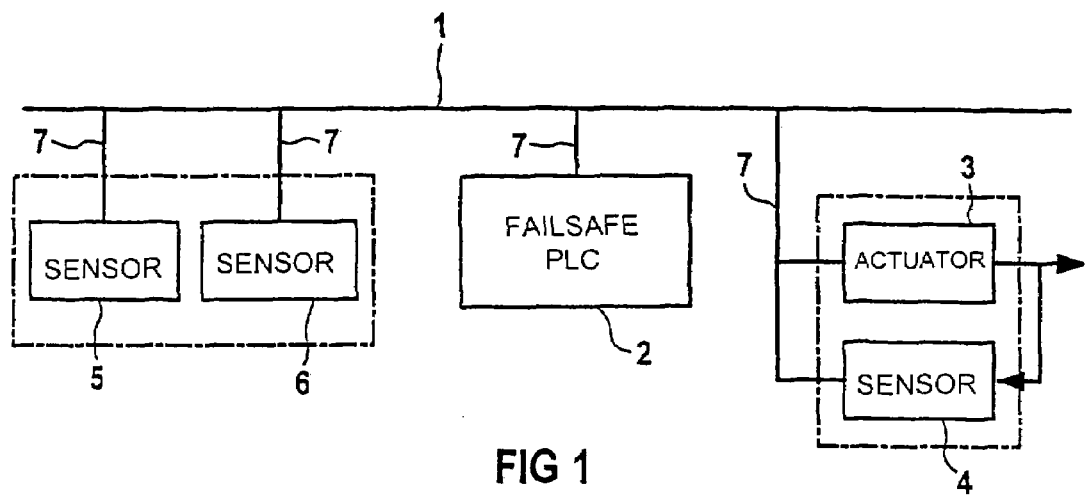
FIG. 1 shows a field bus system with a freely programmable controller and standardized field devices according to the prior art connected to it.

Reference will now be made in detail to the preferred embodiments of the present invention, examples of which are illustrated in the accompanying drawings, wherein like reference numerals refer to like elements throughout.

In the field bus system according to the prior art and as shown in FIG. 1, a safety PLC or failsafe PLC 2, an actuator 3 and sensors 4, 5, 6 are connected to a standard field bus 1 via connecting lines 7. The sensors 5 and 6 are in this case redundant, and the actuator 3 and the sensor 4 can be read back.

These field devices 3, 4 and 5, 6 are redundant or proven-safe standard field devices, which are controlled via the safety PLC 2. The field bus 1 is used to communicate with the field devices. This known field bus system with connected field devices does not ensure safety, for example, against common-mode faults. On the basis of the present prior art, this would be possible only by using specific, safety-certified sensors and actuators.

Figure 2:
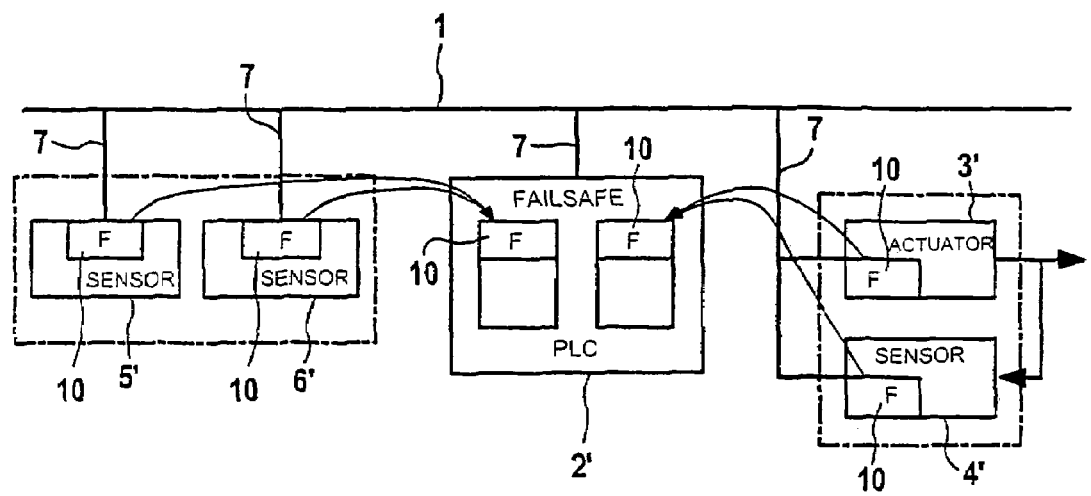
FIG. 2 shows a standardized field bus system with field devices according to the invention connected to it, and with a safety PLC.

According to the invention, as is illustrated in FIG. 2, the field devices are now each equipped with a safety layer (F layer) 10. Each standard field device 3', 4' and 5', 6' with an appropriately equipped F-PLC 2' is thus able to use the field bus 1 to cover faults such as freezing of the signal values in a communications circuit, addressing faults etc. It is thus feasible at extremely low cost to cover common-mode faults even in the case of standard field devices by implementation of a safety layer 10, which is known per se, in the standard field devices 3', 4', 5', 6'.

This F layer or safety layer 10 is, for example, a so-called Profibus driver, which is also known by the title Profisafe from the Siemens AG Company.

The invention has been described in detail with particular reference to preferred embodiments thereof and examples, but it will be understood that variations and modifications can be effected within the spirit and scope of the invention.

The invention claimed is:

1. A microprocessor-controlled standard field device for connection to a field bus system, which is connected to a freely programmable controller, comprising:
   a software safety layer distributed across the microprocessor-controlled standard field device and the freely programmable controller, carrying out proven-safe communication between said microprocessor-controlled standard field device and the freely programmable controller.

2. The microprocessor-controlled standard field device as claimed in claim 1, wherein said safety layer enables identification of common-mode faults between said microprocessor-controlled standard field device and the freely programmable controller.

3. The microprocessor-controlled standard field device as claimed in claim 2, wherein said safety layer carries out Profisafe communication.

4. The microprocessor-controlled standard field device as claimed in claim 3, further comprising a connection to a Profibus.

5. The microprocessor-controlled standard field device as claimed in claim 4, wherein said safety layer can be switched on and off.

6. The microprocessor-controlled standard field device as claimed in claim 5, wherein the field device is a measured value sensor.

7. The microprocessor-controlled standard field device as claimed in claim 5, wherein the field device is an actuator.

8. A field bus system, comprising:
   at least one freely programmable safety controller, each having a software safety layer;
   at least one microprocessor-controlled standard field device, each including the software safety layer for carrying out proven-safe communication with in said at least one freely programmable safety controller; and
   a bus connecting said at least one freely programmable safety controller and said at least one microprocessor-controlled standard field device.

9. The field bus system as claimed in claim 8, wherein the safety layer in said at least one freely programmable safety controller and said at least one microprocessor controlled standard field device enables identification of common-mode faults based on the proven-safe communication between each of said at least one microprocessor-controlled standard field device and said at least one freely programmable safety controller.

10. The field bus system as claimed in claim 9, wherein the safety layer in said at least one freely programmable safety controller and said at least one microprocessor controlled standard field device carries out Profisafe communication.

11. The field bus system as claimed in claim 10,
wherein said bus is a Profibus, and
wherein each microprocessor-controlled standard field device includes a connection to the Profibus.

12. The field bus system as claimed in claim 11, wherein the safety layer in said at least one micropressor-controlled standard field device can be switched on and off.

13. The field bus system as claimed in claim 12, wherein at least one microprocessor-controlled standard field device is a measured value sensor.

14. The field bus system as claimed in claim 12, wherein at least one microprocessor-controlled standard field device is an actuator.

15. A field bus system as claimed in claim 8,
wherein each of said at least one microprocessor-controlled standard field device includes communication software in the safety layer generating signals that make proven-safe communication with said freely programmable safety controller possible, and
wherein said freely programmable safety controller executes software modules that receive the signals from said at least one microprocessor-controlled standard field device on a safe basis to ensure that said at least one microprocessor-controlled standard field device carries out proven-safe communication.

16. A field bus system as claimed in claim 15, wherein the software modules in said freely programmable safety controller correspond to a channel system for at least one of SEL 2, SEL 3 and SEL 4 signal transmissions.

17. A field bus system as claimed in claim 16, wherein said at least one microprocessor-controlled standard field device includes a redundant standard field device.

* * * * *

UNITED STATES PATENT AND TRADEMARK OFFICE
CERTIFICATE OF CORRECTION

| | |
|---|---|
| PATENT NO. | : 7,337,369 B2 |
| APPLICATION NO. | : 10/475710 |
| DATED | : February 26, 2008 |
| INVENTOR(S) | : Herbert Barthel et al. |

It is certified that error appears in the above-identified patent and that said Letters Patent is hereby corrected as shown below:

Column 4, Line 50, change "with in" to --with--.

Signed and Sealed this

Eighth Day of July, 2008

JON W. DUDAS
*Director of the United States Patent and Trademark Office*